(12) United States Patent

Kemp, III

(10) Patent No.: US 12,691,820 B1

(45) Date of Patent: Jul. 28, 2026

(54) CONTINUOUS RAIL AND AIRBORNE RAIL TRANSIT ALERT SYSTEM FOR PEDESTRIANS, VEHICLES AND ANIMALS

(71) Applicant: Fred M. Kemp, III, Warson Woods, MO (US)

(72) Inventor: Fred M. Kemp, III, Warson Woods, MO (US)

(73) Assignee: THE FRED M. KEMP FOUNDATION, St. Louis, MO (US)

( * ) Notice: Subject to any disclaimer, the term of this patent is extended or adjusted under 35 U.S.C. 154(b) by 802 days.

(21) Appl. No.: 17/205,182

(22) Filed: Mar. 18, 2021

Related U.S. Application Data

(60) Provisional application No. 62/992,094, filed on Mar. 19, 2020.

(51) Int. Cl.

| | |
|---|---|
| *B60Q 5/00* | (2006.01) |
| *A01M 29/16* | (2011.01) |
| *B60R 21/34* | (2011.01) |
| *G01K 11/26* | (2006.01) |
| *B60R 19/00* | (2006.01) |
| *B61F 19/06* | (2006.01) |
| *B61L 23/04* | (2006.01) |

(52) U.S. Cl.
CPC ............. *B60Q 5/006* (2013.01); *A01M 29/16* (2013.01); *B60Q 5/008* (2013.01); *B60R 21/34* (2013.01); *G01K 11/26* (2013.01); *B60R 2019/005* (2013.01); *B61F 19/06* (2013.01); *B61L 23/041* (2013.01); *H04R 2217/03* (2013.01)

(58) Field of Classification Search
CPC .. B61L 29/24; B61L 23/00; B61L 5/20; B61F 19/06; B61K 13/00; G10K 9/12
USPC .......................... 246/124, 294; 213/220, 221
See application file for complete search history.

(56) References Cited

U.S. PATENT DOCUMENTS

| | | | | |
|---|---|---|---|---|
| 1,168,472 | A * | 1/1916 | Bloxton ................. | B61L 11/02 246/340 |
| 1,775,675 | A * | 9/1930 | Gherassimoff ....... | B61L 29/284 246/125 |
| 5,515,026 | A * | 5/1996 | Ewert .................... | B60Q 1/525 340/384.1 |
| 5,786,750 | A * | 7/1998 | Cooper ................. | B61L 23/044 246/166 |
| 6,011,855 | A * | 1/2000 | Selfridge .............. | H04R 17/00 310/324 |
| 6,359,990 | B1 * | 3/2002 | Norris .................... | H04R 27/04 381/75 |

(Continued)

*Primary Examiner* — Zachary L Kuhfuss

(74) *Attorney, Agent, or Firm* — Sandberg Phoenix & von Gontard, PC

(57) ABSTRACT

An alert system for railed vehicles than can operate continuously or nearly continuously to warn pedestrians, vehicles and animals. In one embodiment, the system has a transmitter in close proximity with one or more rails for applying energy to become a medium for the energy that is felt or heard at a warning distance. In another embodiment, a transmitter is mounted on a train to broadcast a highly focused airborne warning that can be heard or felt even by the hearing impaired. Optionally, but desirably, the system has a forward-looking sensing device for identifying an obstruction in a prescribed warning area that triggers an auxiliary warning system with a customized (or tailored) warning based on that identification that also may be heard or felt.

18 Claims, 6 Drawing Sheets

36 — Object Tracking System

Identified Objects (Individuals, Vehicles, Animals)

38 — Auxiliary Warning System

Tailored Output Signal

(56)        References Cited

U.S. PATENT DOCUMENTS

| | | | | |
|---|---|---|---|---|
| 7,429,935 B1 * | 9/2008 | Brenner | .................. | B61L 29/24 |
| | | | | 246/473.1 |
| 8,453,551 B2 * | 6/2013 | Rosenberg | .......... | F41H 13/0068 |
| | | | | 250/503.1 |
| 9,102,342 B2 * | 8/2015 | Graber | .................... | B61L 23/00 |
| 2001/0007316 A1 * | 7/2001 | Payne | .................... | B61F 19/06 |
| | | | | 213/220 |
| 2002/0027831 A1 * | 3/2002 | Futsuhara | ................ | G01H 1/12 |
| | | | | 367/96 |
| 2004/0011756 A1 * | 1/2004 | Payne | .................... | B61F 19/06 |
| | | | | 213/220 |
| 2005/0040935 A1 * | 2/2005 | Ewert | ...................... | B60Q 5/00 |
| | | | | 340/384.2 |
| 2011/0026729 A1 * | 2/2011 | Nakayama | ............ | B60Q 5/008 |
| | | | | 381/86 |
| 2012/0318932 A1 * | 12/2012 | Parida | .................... | B61L 23/00 |
| | | | | 246/473 R |
| 2013/0214097 A1 * | 8/2013 | Graber | ................... | B61L 23/00 |
| | | | | 246/174 |
| 2016/0368510 A1 * | 12/2016 | Simon | .................. | B61L 25/025 |

* cited by examiner

FIG. 3 (not to scale)

CONTINUOUS RAIL AND AIRBORNE RAIL TRANSIT ALERT SYSTEM FOR PEDESTRIANS, VEHICLES AND ANIMALS

BACKGROUND

In the United States, there are some 180,000 miles of railroad track. Between 2013 and 2017 pedestrian railroad deaths rose from 702 to 888 annually. This translates to over approximately 2 deaths per day just in the United States. Worldwide, the number is quite higher. While the European Union in 2019 recorded some 885 deaths, the Mumbai Suburban Railway System alone in India reports an extremely high 6,000 pedestrian deaths per year or an average of 16 deaths per day.

Pedestrian railroad accidents are the leading cause of death on railways. While some of these incidents are intentional suicides, most are considered unintentional by the Federal Railroad Administration and can be reduced with a better and effective warning system. There are also many railroad worker accidents and deaths.

To help mitigate this issue in the U.S., the Rail Safety Improvement Act of 2008 was enacted. A primary result of this act was Positive Train Control (PTC). The PTC consists of a bundle of state-of-the-art technologies meant to avoid accidents to help mitigate accidents and deaths. A lot of the emphasis in PTC is to mitigate human error by the utilization of advanced technologies. Through 2015, 6.4 billion U.S. dollars were spent for the PTC deployment on more than 4,500 locomotives. By the end of 2020, the total costs are expected to more than 10 billion U.S. dollars.

Unfortunately, despite this investment, the leading cause of railroad fatalities, pedestrian railroad deaths, has been rising. Clearly, there is room for life-saving improvement in this area.

Most of the warning systems have focused on more congested areas although pedestrian deaths can and do occur anywhere the rails are located-whether in a crowded metropolitan area or in a remote locale. Fast-moving and silent transit systems, such as electrical or magnetic levitation systems are particularly dangerous as pedestrians are more likely not to be warned soon enough to avoid an incident. In addition to the high cost of human life, there are also numerous additional costs involved with these incidents in legal defense, railroad operation delays, multimillion dollar settlements, administrative and other related costs. A Federal Railroad Administration team of experts found that the five-year period between 2012 and 2016 cost the United States society approximately $43 billion. In addition to this tragic human and monetary cost, animals are often injured or killed by trains.

Many alert and warning systems have been devised that range from a simple broadcasting horn or similar gross application noise-generation device to complex systems that activate a fixed alert system such as a road or pedestrian crossing. Usually, these latter warning/alert systems are activated by a wired or wireless activation device located on the tracks, GPS or similar tracking systems or from onboard the transit system itself and initiate warning systems that create a visual and/or aural warning/alert. In the United States, these are often a sound-emitting warning system bells with flashing lights and, in the better installations, activation of a physical barrier such as a road/pedestrian-blocking gate.

While these fixed alert systems are generally effective at designated highly trafficked crossings and intersections, they are expensive and are limited in practicality to relatively highly-congested areas. In addition to not being effective for over 99% of the hundreds of thousands of miles of track, they are subject to mechanical, electrical and activation failures.

A simple broadcasting horn or other sound-generation devices can be effective at certain times and locations to warn of an oncoming rail vehicles, such as passenger trains, light rail trains or streetcars and subway trains, but it is not practical for such systems to be sounding at all times while the train is running-particularly in residential neighborhoods or in business districts. In addition, horns may not be heard in other loud environments and may also detract engineers' attention from sounds that may alert them to a safety issue. And, while transit engineers are directed to sound horns in certain designated areas, the engineer often cannot know to sound a horn at night or to timely realize or even know that there is a pedestrian presence in remote areas. So, horns and related noise-generation devices cannot be counted upon and are not practical to be operated on a continuous basis. As a result, horns cannot adequately warn pedestrians and animals in the vast majority of situations.

Similarly, warning systems utilizing lights are effective under very limited, ideal conditions such as under clear conditions at night where there are no other distractions.

Adding to these problems is that pedestrians can be distracted and miss a horn, light or other signal and deaf pedestrians cannot normally hear an aural warning. A horn can also be blocked out by loud music or other background noise as may be present. In recent years, many deaths are caused by pedestrians listening to music with earphones or earbuds. Also, hearing-impaired pedestrians are at higher risk if only a typical warning horn is used.

What is needed is a continuous warning/alert system that reduces the possibility of human error and does not rely on a complex activation system that can also fail. In addition, the ideal system would work in all weather and light conditions. More so, the ideal system would have a very low possibility of failure and be dependable. Further, a warning/alert system that can be utilized in high density or residential neighborhoods without disturbing businesses and residents not physically on the tracks would be ideal. The ideal system would not be limited to only sounds and would be able to alert pedestrians utilizing earplugs or earphones or those that are hearing-impaired.

There is clearly much room for improvement in how to alert pedestrians—the leading cause of railroad deaths.

SUMMARY

An oncoming rail transit warning device for pedestrians, animals and vehicles is disclosed herein.

The warning system utilizes an extremely directional airborne warning system that can utilize sound, vibration or other energy warnings to pedestrians, vehicles and animals. Due to certain circumstances, this airborne warning system cannot always be operated continuously but is nearly continuous so that its effectiveness is still very high.

This nearly continuous warning system utilizes a highly focused speaker system, such as a parametric speaker system as described by Norris in U.S. Pat. No. 6,011,855. A similar system can concentrate sounds directly in front of the train in a very narrow beam.

With a narrow, focused beam of sound, and/or vibration, the sound forward of the rail vehicle can be directed to specific area in front of the rail vehicle primarily within the typical 50 foot right of way. In this way, and similar to the first embodiment herein, this energy can be directly so as not to unnecessarily disturb others away and outside of the right of way.

The highly focused beam can be non-articulated (i.e., mounted stationarily to the front of the rail vehicle) or it can be articulated to follow the rail tracks to further minimize the warning sound outside of the prescribed warning area. The articulation might be accomplished by computer-driven tracking system, a mechanical tracking system or by GPS or similar mapping. Regardless of how the articulation might be accomplished, if the warning is articulated, it can be more accurately be contained within an even smaller area within the right of way to allow a more effective warning on a nearly continuous basis even in highly populated areas.

There may be times that the warning system cannot be used due to particular conditions that would make it impractical. These could include overpasses, turns, vertical curves and other conditions that the energy beam may need to be temporarily reduced or shut off completely to avoid unwanted errant sounds.

Mounted to the front of a rail vehicle, either the articulated or non-articulated warning system can incorporate a computerized sensing device that can determine if there is an obstruction in front of the train and possibly determine what type of obstruction it might be such as a pedestrian, vehicle or animal. Regardless of the obstruction type, a persistent obstruction can trigger an automatic increase in the intensity of sound and/or the introduction of a more potent warning.

This more potent warning can be outside of the range of human hearing or highly directional lighting that can warn pedestrians, vehicles and animals of the oncoming train-even those wearing ear buds or with a hearing impairment. Specifically, the more potent warning can be of a frequency that is felt by or provides a kinetic warning to the receiver. The warning can be amplified to create discomfort to those who may have earphones, earbuds or a hearing impairment. A parametric warning system can do this as well as others, such as the millimeter wave system as disclosed by Rosenberg, et. al. in U.S. Pat. No. 8,453,551.

Of particular importance, and regardless of the specific type of more potent warning system utilized, these more potent warnings can be automatic and computer-controlled and remove the human element. This dramatically increases the likelihood of a timely warning. Of course, the system can also be controlled by a person, such as a train engineer.

In summary, the preferred embodiment disclosed herein will cause a pedestrian, animal or vehicle to be initially warned of an oncoming rail vehicle. The warning is in the form of a highly focused nearly continuous beam of sound and/or light which can warn of the oncoming rail vehicle followed by an ever-increasing level of sound and more potent warning as a collision may become more imminent. All this life-saving activity can occur within the general limits of the rail right of way so as not to disturb people in houses, schools, businesses and other locations nearby.

BRIEF DESCRIPTION OF THE DRAWINGS

In the accompanying drawings, which form a part of the specification and are to be read in conjunction therewith in which like reference numerals are used to indicate like or similar parts in the various views:

FIG. 3 shows a profile overview of the airborne warning system.

DETAILED DESCRIPTION

The claimed invention provides a comprehensive, all-weather, continuous and cost-effective method to alert pedestrians, vehicles and animals of an oncoming rail vehicle that no other system has been able to provide to date. The system also escalates the warning in real time in response to the situation.

Figure 1:
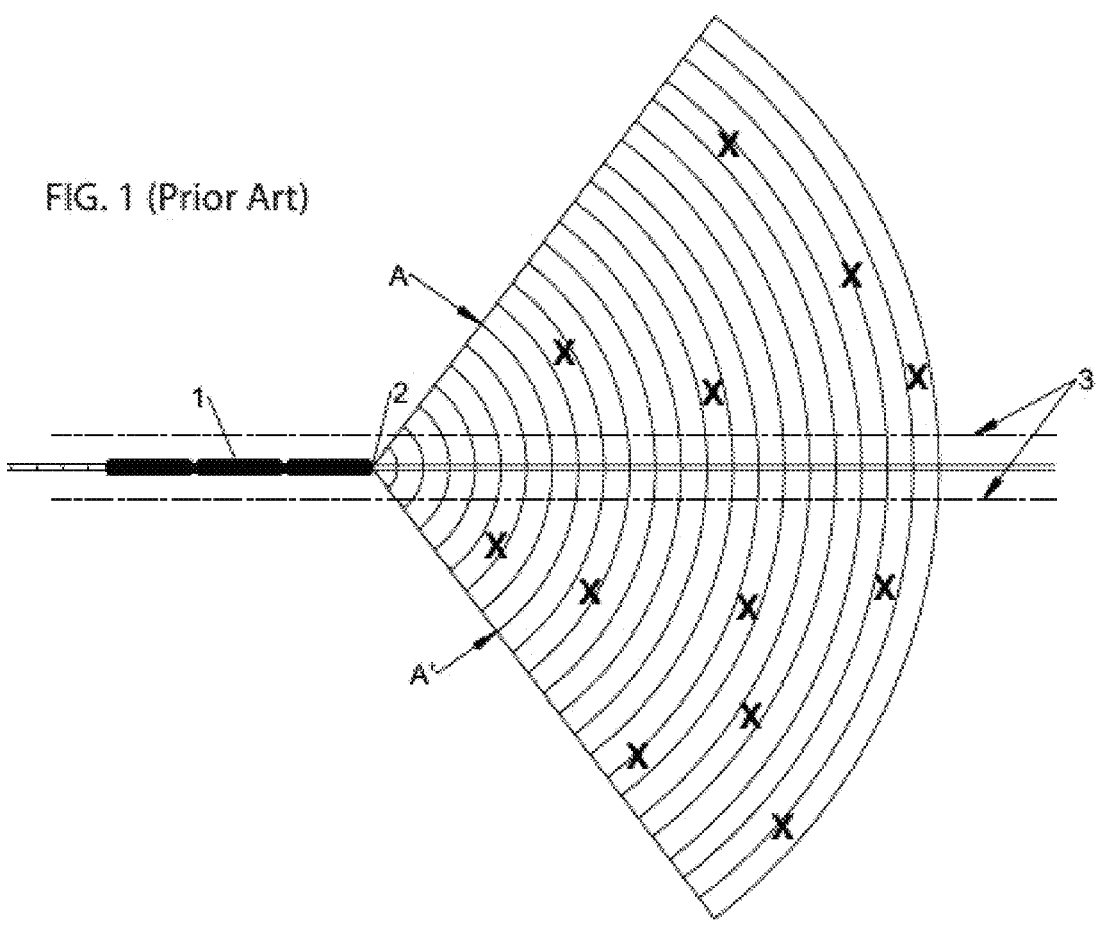
FIG. 1 shows the prior art of a train warning system.

FIG. 1 is a plan view of a train 1 equipped with a normal warning horn system. When activated the horn 2 is heard 360 degrees around the train for quite a distance but is most focused in an area in front of the train 1 that is approximately delineated forward of that area delineated by lines A and A'. Typical railroad horns are very loud and disruptive. The X's indicate various locations of areas that the sound from horn 2 reaches which is undesirable and disrupting such as the locations of homes, businesses, schools, pedestrians, etc. A right of way 3 is that area normally where a warning sound is most needed to avoid an injury or death incident. The right of way area 3 as shown is 50' wide and is similar to a typical 50 foot wide railroad right of way. However, right of way area 3 is used for illustration and need not be 50 feet wide and may be wider or narrower depending the needs of the railroad operator, governmental authority or similar decision maker and may not correspond to the actual railroad right of way.

Figure 2:
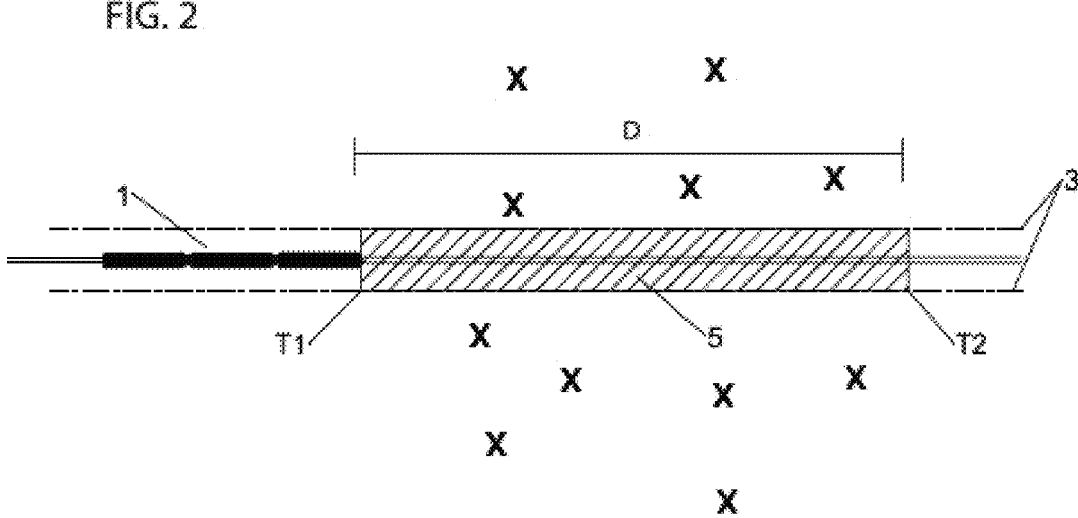
FIG. 2 shows the target warning area for warning system embodiments.

FIG. 2 is a plan view of a rail vehicle 1 with desired warning distance D. Desired warning distance D is the distance forward of the rail vehicle 1 that is determined by the speed of the rail vehicle and the desired warning time between the front of the rail vehicle T1 and the anticipated future position of the rail vehicle T2. For a pedestrian, vehicle or animal to be adequately warned, they must be notified of the oncoming rail vehcile with enough time to allow for the delay in reaction time plus an additional safety factor as may be determined. For example, a train travelling at 70 miles per hour travels approximately 102.6 feet per second. To give an advance warning of 5 seconds, the desired warning distance D would be 102.6×5 seconds or 513 feet. For a train traveling at 60 miles per hour, a 5 second warning would require the warning distance D be 440 feet and so on. Therefore, the train's speed and desired notice time determine desired warning distance D.

Desired warning distance D coupled with the desired width of the right of way 3 determines the ideal warning area 5 as shown by the hatched area in FIG. 2. The ideal warning area 5 sets the general requirements of an adequate warning system by delineating how much warning time is given and what the ideal warning extents are within the right of way. Warning sound volume intensity and character must be sufficient in the ideal warning area 5 to alert people, vehicles and animals.

FIG. 3 illustrates the warning system described herein mounted to the front of a freight train engine. The warning system is a continuous warning system that incorporates a transmitter 6. The transmitter 6 is mounted generally towards the front of a engine 1. Power to the transmitters 6 is through the use of the electrical power system of the engine 1. A receiver 8, within the critical warning area 5, in this case, a pedestrian, is alerted to the oncoming train by the warning system without out causing significant disruption of others outside the right of way.

As discussed more fully below, the transmitter 6 may run continuously and autonomously without the need of a control system-possibly running when a minimum speed is attained- or there may be a control system that the operating engineer may be able to activate/deactivate and change the energy in some way, such as changing pulse frequency, from the cab section of the train. An autonomous and automatic, computer-controlled system would be more in keeping with the goals of the U.S. Congress and the PTC program to minimize human error.

Figure 4:
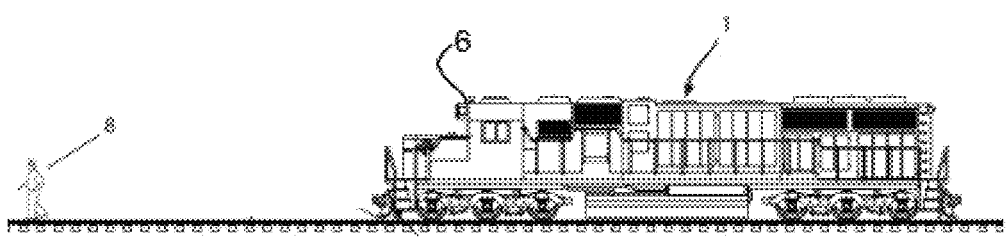
FIG. 4 is a schematic view of the airborne system demonstrating the warning being retained within a rail right of way.

FIG. 4 is a plan view of a train 1 comprised of several rail vehicles. The train 1 includes a warning system 32 which is operated continuously or nearly continuously. The warning system 32 comprises the transmitter 6 mounted on the lead or front rail vehicle and that can broadcast a highly focused airborne warning that can be heard or felt by pedestrians, vehicles and animals. The transmitter 6 is generally mounted on the front of the rail vehicle 1 and in the preferred embodiment, generates a highly focused sound system to warn pedestrians, vehicles and animals that a railed vehicle, such as a train, is coming. As is known, a low frequency sound can be felt by pedestrians and animal. Although the preferred embodiment herein is parametric, any system that can employ focused sound can be utilized such as a horn that may be focused with a parabolic reflector.

The transmitter 6 of the airborne warning system 32 is ideally mounted on the front of the train 1 and provides a nearly constant warning tone(s), voice warnings or similar. While the transmitter could be fixed to the front of the train 1, ideally, it is mounted to be articulated so that the signal emitted by the transmitter can remain generally centered in the right of way 3, even in turns.

Various object tracking software systems have been developed for automobiles to track roads autonomously. The warning system 32 could include an object tracking system 36 which is integral with the warning system and which would be co-located or nearly co-located with the transmitter 6 on the front of the train 1. Under the direction of the object tracking system 36, the energy beam 34 emitted by the transmitter 6 can be focused on the forwardmost and the key part of the ideal warning area 5 to keep unwanted and disruptive sounds outside of the right of way minimized.

The energy beam 34 shown is five degrees wide and is consistent with certain parametric systems. Five degrees is almost exactly the width of a 50 foot right of way for a train traveling at 80 miles per hour with a desired warning distance D that corresponds to a 5-second advance warning time. Eighty miles per hour equates to about 117 ft/sec, and thus 5 seconds at 80 mph produces a distance D of about 586 feet.

The airborne warning system 32 can operate without an object-tracking system using a fixed position or a mechanically-directed articulation system such as may be directed physically in a turn.

Despite the articulation and high directionality of the airborne warning system 32, there will be times that the warning system cannot avoid producing unwanted sound outside the right of way 3 such as might occur on overpasses, vertical turns and other similar areas. In those cases, the warning system can be pre-programmed to temporarily shut off utilizing GPS or by some other means, such as an on/off sensor mounted on the tracks. Except for these exceptions, the preferred embodiment of the airborne warning system 32 would be unlike prior art warning systems and provide a nearly continuous, high-volume warning to pedestrians, vehicles and animals within the right of way 3.

Figure 5:
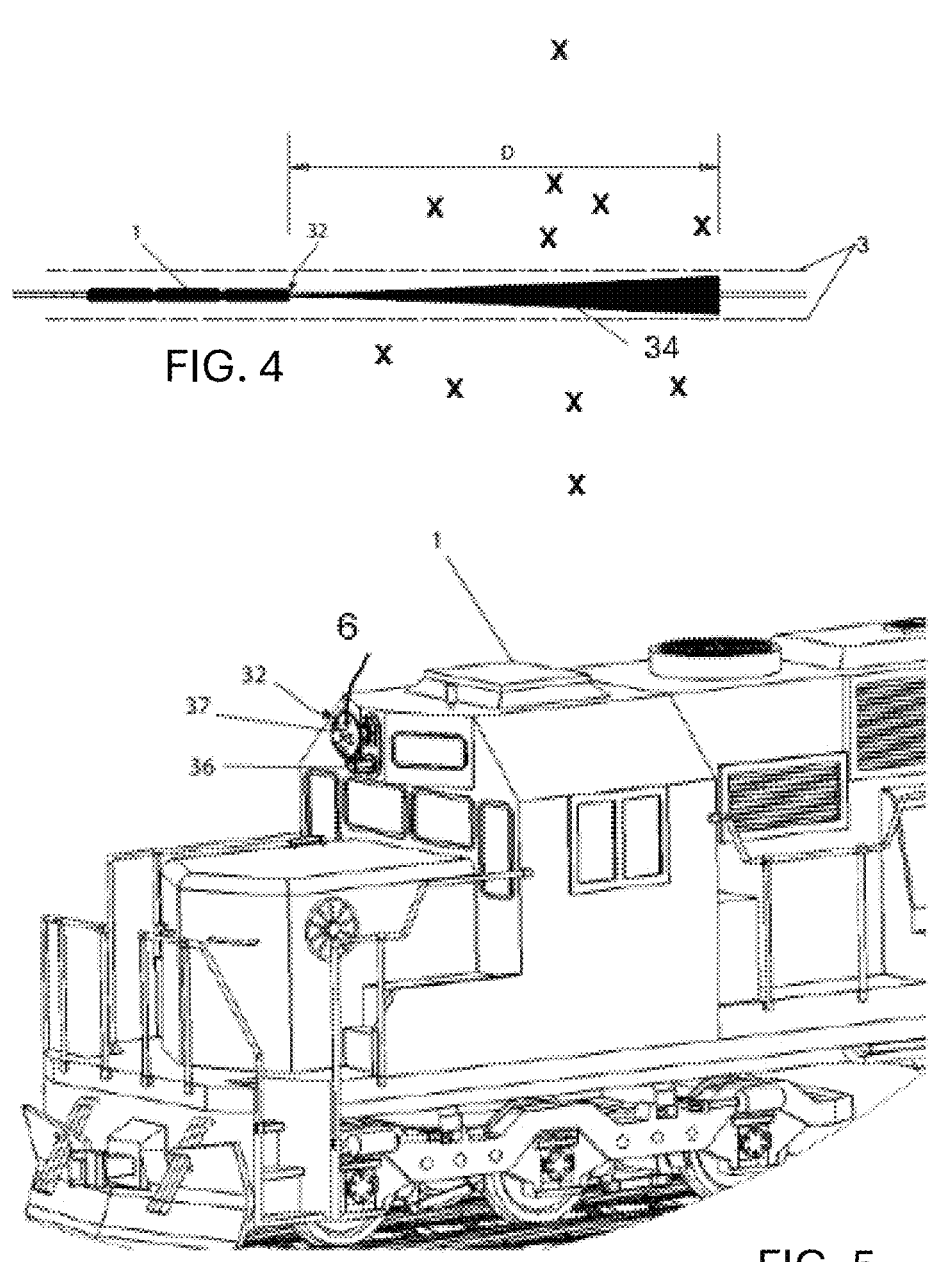
FIG. 5 is a perspective close-up view of the articulated parametric warning system illustratively shown mounted to the front of a freight train engine.
Figure 6:
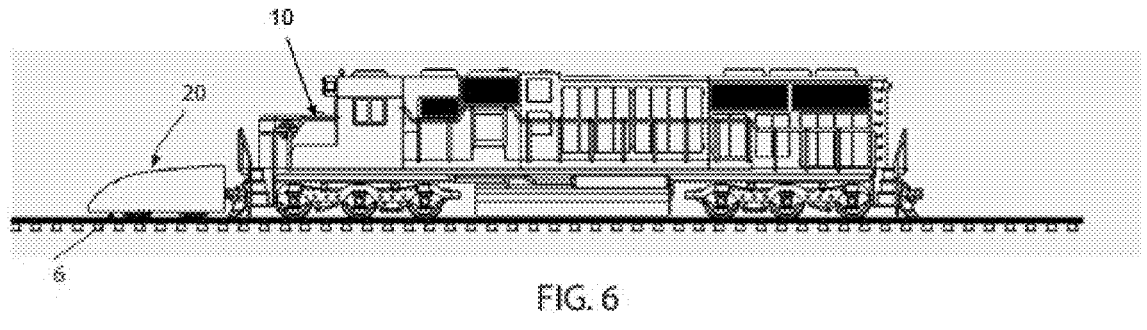
FIG. 6 is a side view of a rail vehicle with a separate railcar to which the warning system can be mounted.
Figure 7:
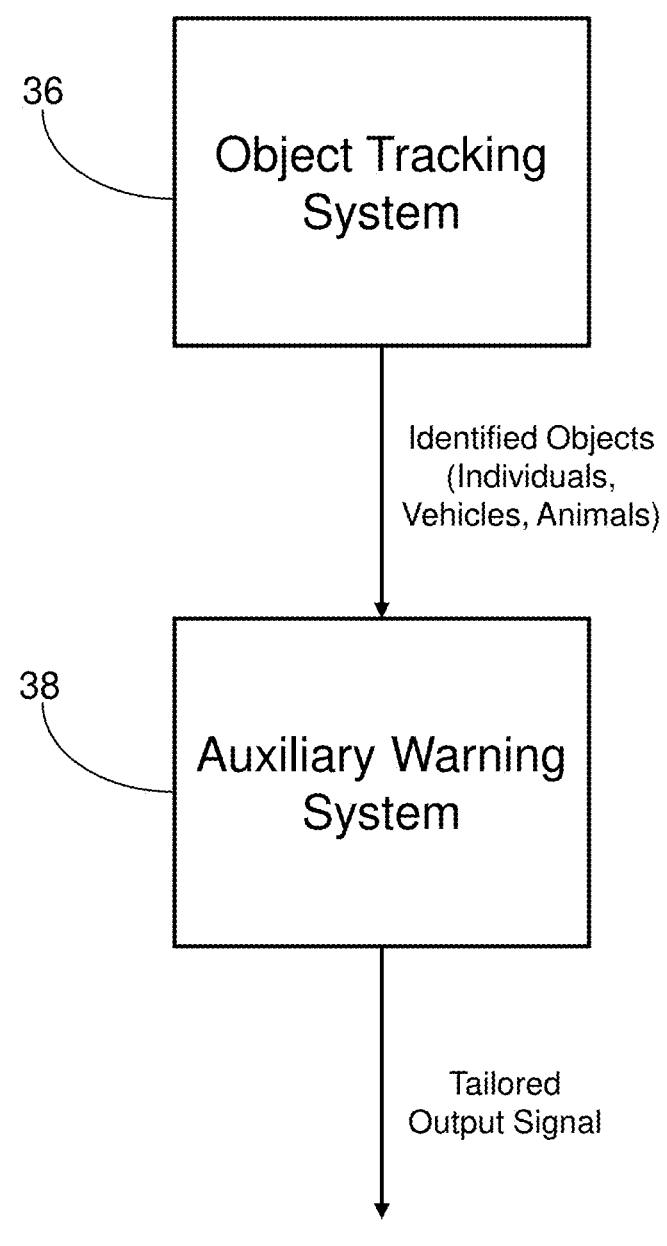
FIG. 7 is a black box schematic of how the auxiliary warning system modulates output signals in response to information from the object tracking system.
Figure 8:
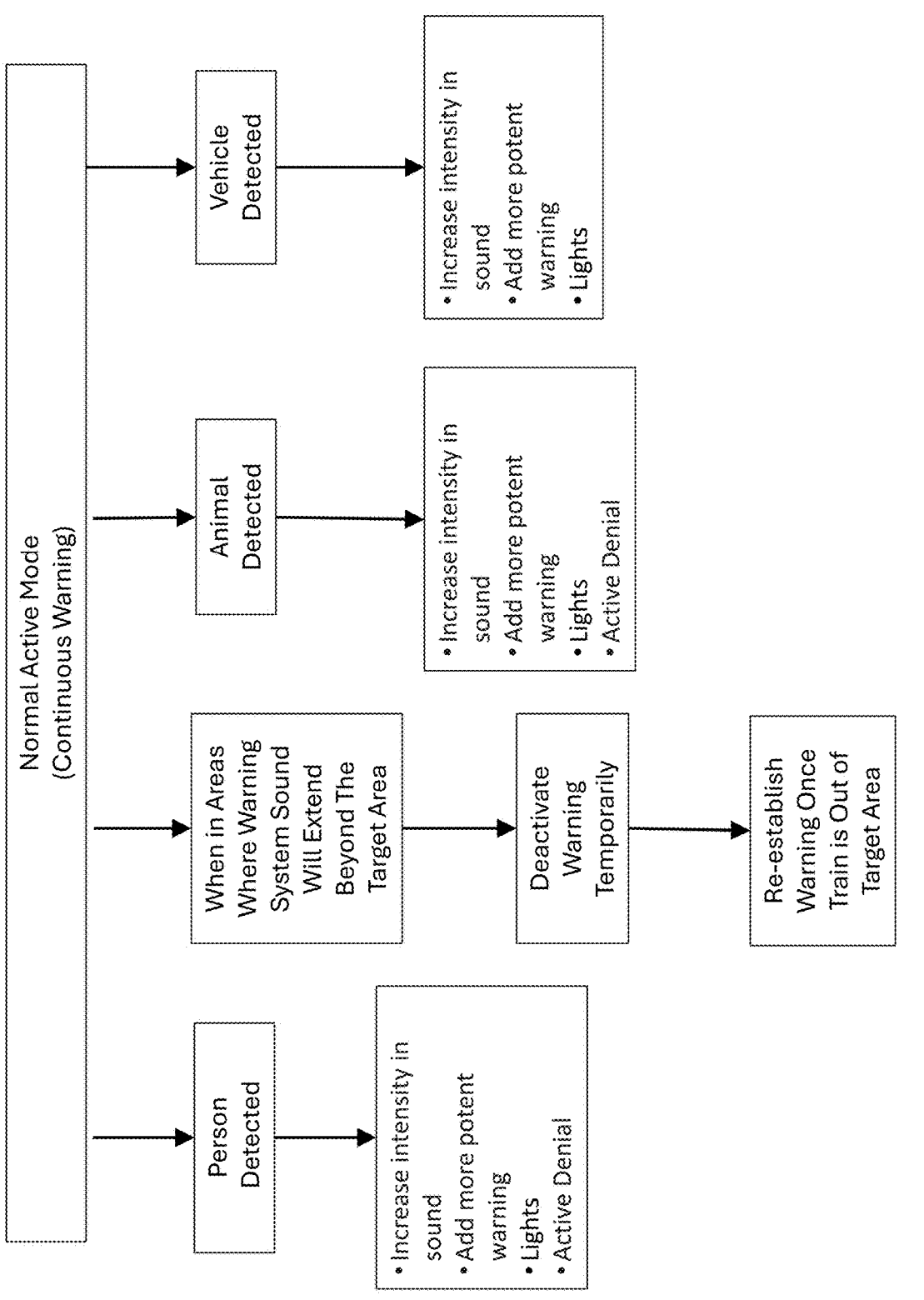
FIG. 8 is a flow chart of the operation of the warning system
Figure 9:
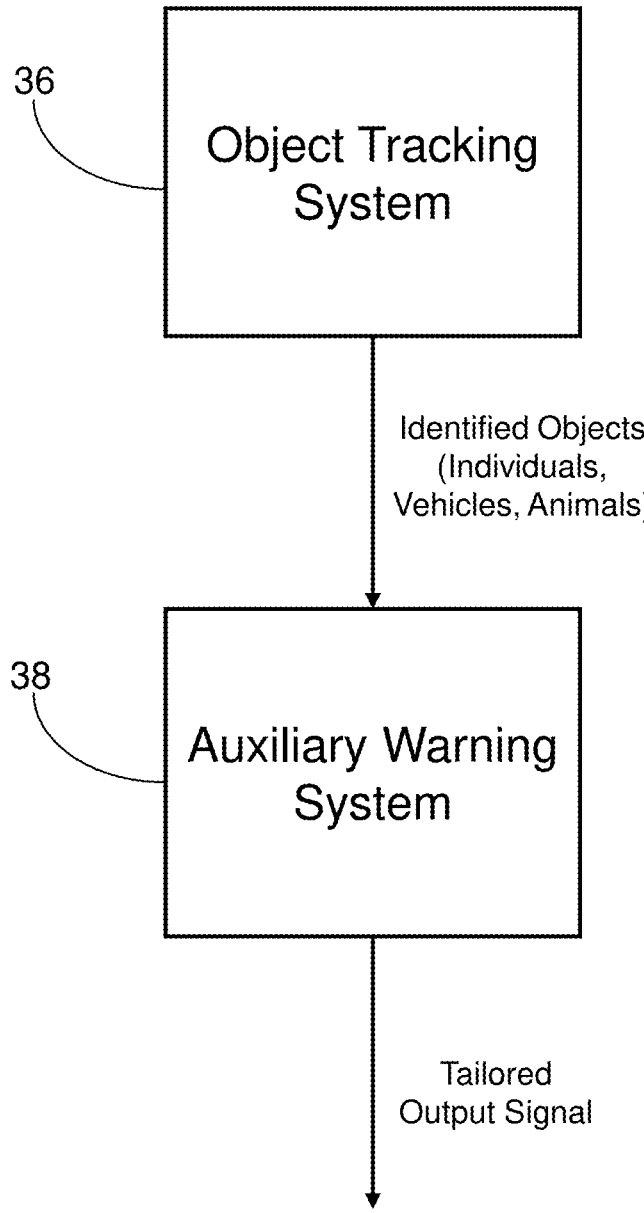
Figure 10:
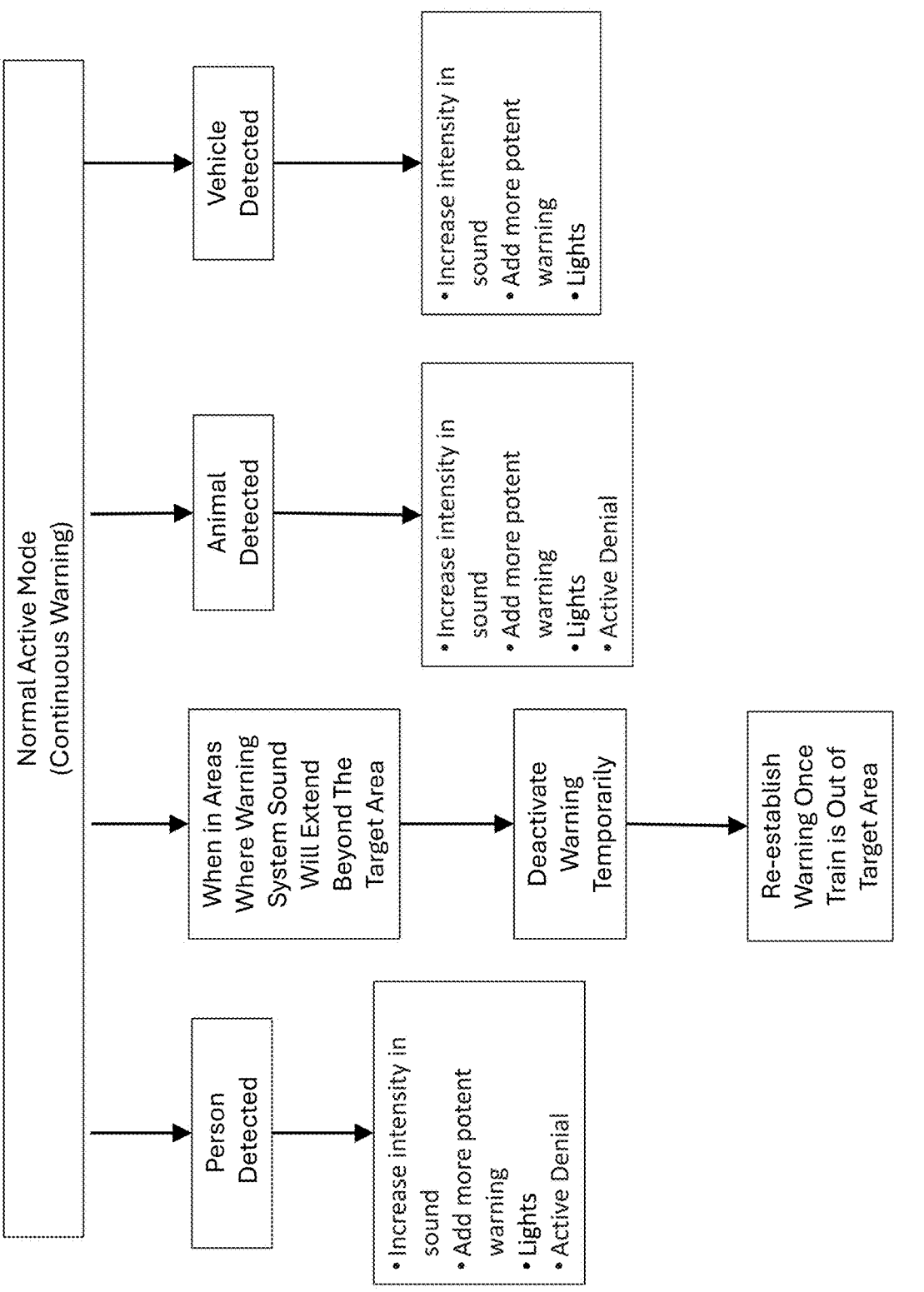

FIG. 5 shows one possible configuration of an articulated airborne warning system 32 having an object tracking system 36, which like many cameras and security systems, can identify individuals, vehicles and animals. As shown in the schematic of FIG. 6, in response to information from the object tracking system 36, an auxiliary warning system 38 can change the warning content such as changes in pitch, verbal warnings or similar as well as initiate a more potent signal or a millimeter-wave transmission similar to that used for crowd control for situations that appear to create an imminent danger to a pedestrian, vehicle or animal. Thus, the auxiliary warning will generate a customized or tailored warning based on the identification of a person or animal in front of the train.

In the preferred embodiment, the auxiliary warning system 38 could automatically generate an increasingly more potent signal or additional types of signals, such as an active denial beam, as a collision becomes more imminent thereby maximizing the effectiveness of the warning while simultaneously eliminating the need for human intervention.

An articulated spotlight 37 is also part of the preferred embodiment of the airborne warning system 32 shown in FIG. 5.

It is felt that while an installation of the warning system could be powered off the train's electrical system, a complete airborne warning system 32—due to the efficiencies of piezo-electric speakers, LEDs, modern batteries and other components—the system could be battery-operated and, could be easily attached to existing locomotives without a need for wiring and provide previously unattainable, nearly continuous and effective warning that automatically can increase effectiveness with an even a more potent signal as the situation may require. This attachment could be by switchable magnetic mounts and allow for quick replacement to minimize down time if there is a problem.

In addition to a computer-controlled system, the engineer could monitor and control the warning system- and more potent warnings-through a wired or wireless connection.

FIG. 6 shows a rail vehicle having a bogey 20 mounted to, and preceding, the rail vehicle. The warning system 32 could be mounted on the bogey 20.

In view of the present disclosure, among the differences to the traditional train warning systems may be mentioned. For over 200 years and despite the existence of many inventions in rail safety in prior art, surprisingly none have effectively solved the long-recognized problem of pedestrian, vehicle and animal injuries in both urban and rural areas because traditional warnings could not be used The continuous warning systems disclosed herein provide a new and dramatic result and, except for the state-of-the-art object tracking system, uses technology that has been around for a long time but not effectively utilized. In addition, the more advanced embodiments can successfully warn pedestrians with headphones/earbuds, all without the need for human intervention. Until now, this has been considered not possible.

What is claimed:

1. An airborne warning system for use with a rail vehicle which is movable along a track, the warning system comprising a transmitter mounted on the rail vehicle, said transmitter nearly continuously emitting a narrow warning beam substantially a full time the rail vehicle is moving, said narrow warning beam being an airborne warning directed to be focused down the track in a direction of travel of the rail vehicle, said narrow warning beam being sized to keep said narrow warning beam within a warning area for a desired warning distance, said warning area being delimited on opposite sides by a railroad right of way and having a width corresponding to the railroad right of way; said warning distance being at least a distance traveled by the rail vehicle in 5 seconds, whereby said narrow warning beam is contained substantially within said warning area for said desired warning distance.

2. The system of claim 1 wherein the beam emitted by said transmitter is an active denial warning that can be felt by pedestrians, vehicles and animals.

3. The system of claim 1 wherein a controller is attached to the transmitter for temporarily reducing or shutting off the narrow beam of sound or vibration.

4. The system of claim 1 wherein the transmitter comprises two or more parametric speakers for additional sound or vibration energy transmission and redundancy.

5. The system of claim 1 wherein the transmitter is powered by the rail vehicle's electrical system or is battery operated and attached with a switchable magnetic mount.

6. The system of claim 1 wherein an articulator is attached to the transmitter for keeping the transmitter focused down the track.

7. The system of claim 6 wherein the articulator is under control of a computer-driven tracking system, a mechanical tracking system or a GPS mapping system.

8. The system of claim 1 wherein the transmitter is mounted on a bogey or railcar mounted in front of the rail vehicle.

9. The system of claim 1 wherein the warning system further includes a light.

10. The system of claim 1 further comprising a forward looking computerized sensing device mounted on the rail vehicle for identifying a person, animal, or vehicle in the warning area, wherein the intensity of the beam is increased when a person or vehicle is sensed by the computerized sensing device.

11. The system of claim 10 wherein the intensity of the beam is modified depending on the identification of the obstruction.

12. The system of claim 10 further comprising an auxiliary warning system which is activated by said warning system in response to a signal from the forward looking computerized sensing device indicative of a person, animal, or vehicle being sensed in the warning area to increase the intensity of the warning signal or to activate additional warning signals.

13. The system of claim 12 wherein the auxiliary warning system is a high powered directional light or a kinetic warning.

14. The system of claim 12 wherein the auxiliary warning system is automatic or computer controlled.

15. The airborne warning system of claim 1 wherein the narrow warning beam is of an angle such that said beam does not extend outside of a right-of-way of the rail vehicle for at least 5 seconds.

16. The airborne warning system of claim 1 wherein the narrow beam is 5 degrees wide.

17. The airborne warning system of claim 1 wherein the transmitter comprises a parametric speaker.

18. The airborne warning system of claim 1 wherein the narrow beam is no more than 12 degrees wide.

* * * * *